(12) United States Patent
Adachi

(10) Patent No.: US 10,525,585 B2
(45) Date of Patent: Jan. 7, 2020

(54) ROBOT FIXING SYSTEM AND ROBOT

(71) Applicant: FANUC CORPORATION, Yamanashi (JP)

(72) Inventor: Satoshi Adachi, Yamanshi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/222,130

(22) Filed: Dec. 17, 2018

(65) Prior Publication Data

US 2019/0202050 A1 Jul. 4, 2019

(30) Foreign Application Priority Data

Dec. 28, 2017 (JP) ................................ 2017-253933

(51) Int. Cl.
| | |
|---|---|
| *B25J 17/00* | (2006.01) |
| *B25J 17/02* | (2006.01) |
| *B25J 18/00* | (2006.01) |
| *B25J 9/00* | (2006.01) |
| *F16H 7/02* | (2006.01) |

(52) U.S. Cl.
CPC .............. *B25J 9/0009* (2013.01); *F16H 7/02* (2013.01)

(58) Field of Classification Search
CPC . B25J 19/06; B25J 9/0009; B25J 9/101; B25J 19/0066; F16H 7/02
See application file for complete search history.

(56) References Cited

U.S. PATENT DOCUMENTS

| | | | | |
|---|---|---|---|---|
| 3,717,231 | A | * 2/1973 | Kaufeldt | ................... B03C 3/00 |
| | | | | 192/139 |
| 4,675,763 | A | 6/1987 | Sakai et al. | |
| 7,680,551 | B2 | * 3/2010 | Ikeda | ....................... B25J 9/101 |
| | | | | 318/568.16 |
| 9,168,660 | B2 | * 10/2015 | Sato | ......................... B25J 9/042 |
| 2015/0228509 | A1 | 8/2015 | Hosek | |
| 2015/0246450 | A1 | 9/2015 | Yoneda | |

(Continued)

FOREIGN PATENT DOCUMENTS

| | | |
|---|---|---|
| JP | S5634687 U | 4/1981 |
| JP | S56111413 U | 8/1981 |
| JP | S595404 A | 1/1984 |

(Continued)

OTHER PUBLICATIONS

Japanese Office Action dated Nov. 5, 2019, for Japanese Patent Application No. 2017-253933.

*Primary Examiner* — Jake Cook
(74) *Attorney, Agent, or Firm* — Karceski IP Law, PLLC

(57) ABSTRACT

A robot fixing system includes a base member having a front surface in which an insertion hole is formed; a power transmission member configured to supply a rotational driving force to a movable part, which is supported on the base member in a rotatable manner about a first axis of rotation, by rotating about a second axis of rotation while opposing the front surface, a through hole being formed in the power transmission member to extend parallel to the second axis of rotation in a penetrating manner at a position separated from the second axis of rotation by a distance equal to a distance from the second axis of rotation to the insertion hole; and a fixing pin configured to be simultaneously inserted into the through hole and the insertion hole.

4 Claims, 8 Drawing Sheets

(56) References Cited

U.S. PATENT DOCUMENTS

2018/0193107 A1* 7/2018 Suh .................. A61B 90/50

FOREIGN PATENT DOCUMENTS

| JP | S60135863 U | 9/1985 |
| JP | 2014079863 A | 5/2014 |
| JP | 2014217931 A | 11/2014 |
| JP | 2015163414 A | 9/2015 |

* cited by examiner

ROBOT FIXING SYSTEM AND ROBOT

CROSS-REFERENCE TO RELATED APPLICATION

This application claims priority to and the benefit of Japanese Patent Application No. 2017-253933, filed on Dec. 28, 2017, the entire content of which is incorporated herein by reference.

FIELD OF THE INVENTION

The present invention relates to a robot fixing system and a robot.

BACKGROUND OF THE INVENTION

Conventionally, a jig which fixes a joint shaft of a robot is known. The jig is used for preventing the attitude of an arm, which is supported on a base portion in a rotatable manner about a joint shaft, from changing in performing a maintenance operation for replacing a motor, which drives the joint shaft of the robot, or a reducer (see Japanese Unexamined Patent Application, Publication No. 2014-217931).

SUMMARY OF THE INVENTION

According to one aspect of the present invention, there is provided a robot fixing system which includes: a base member having a front surface in which an insertion hole is formed; a power transmission member configured to supply a rotational driving force to a movable part, which is supported on the base member in a rotatable manner about a first axis of rotation, by rotating about a second axis of rotation while opposing the front surface, a through hole being formed in the power transmission member to extend parallel to the second axis of rotation in a penetrating manner at a position separated from the second axis of rotation by a distance equal to a distance from the second axis of rotation to the insertion hole; and a fixing pin configured to be simultaneously inserted into the through hole and the insertion hole.

According to another aspect of the present invention, there is provided a robot which includes: a base member having a front surface in which an insertion hole is formed; and a power transmission member configured to supply a rotational driving force to a movable part, which is supported on the base member in a rotatable manner about a first axis of rotation, by rotating about a second axis of rotation while opposing the front surface, a through hole being formed in the power transmission member to extend parallel to the second axis of rotation in a penetrating manner at a position separated from the second axis of rotation by a distance equal to a distance from the second axis of rotation to the insertion hole.

DESCRIPTION OF EMBODIMENT(S) OF THE INVENTION

A robot 1 according to a first embodiment of the present invention will be described hereinafter with reference to drawings.

Figure 1:
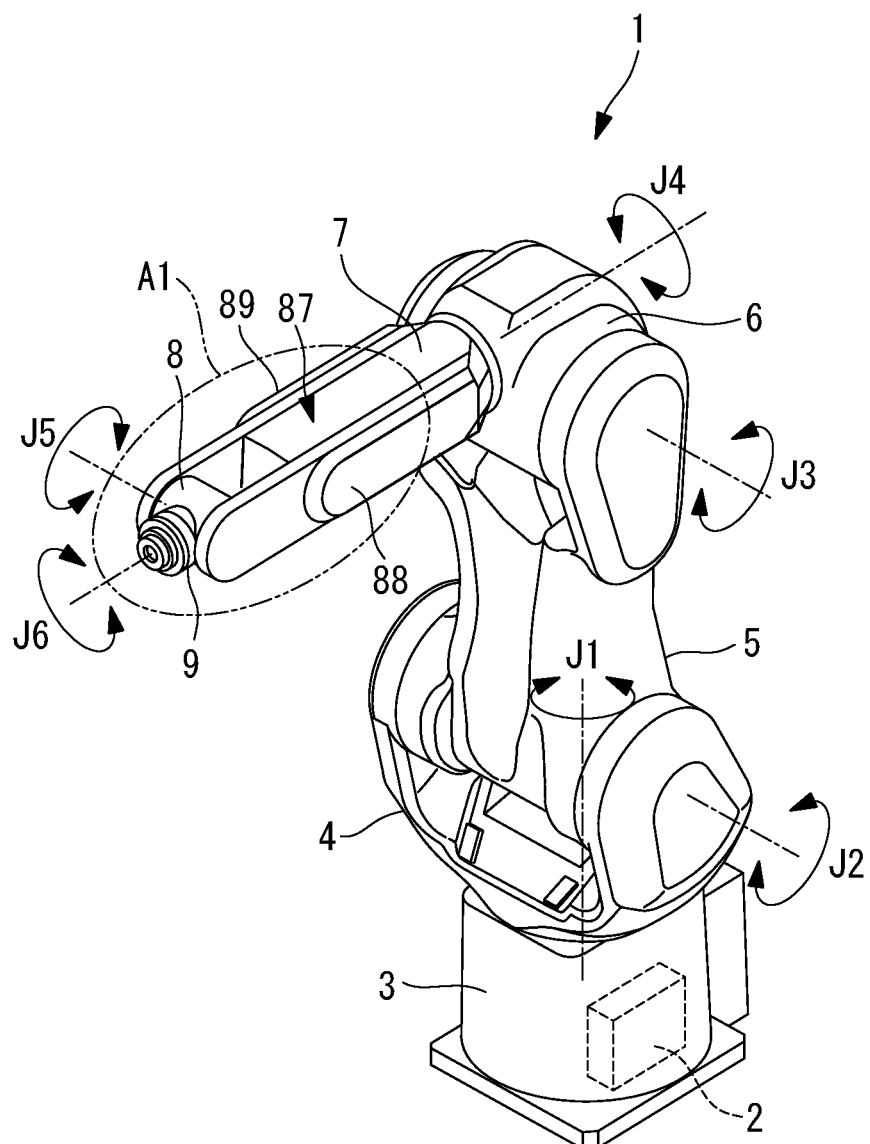
FIG. 1 is a schematic perspective view of a robot according to a first embodiment.

FIG. 1 is a schematic perspective view of the robot 1 according to the first embodiment. The robot 1 of this embodiment is a robot, such as a vertical articulated robot, having six axes J1 to J6. The robot 1 includes: a base 3; a revolving body 4; a first arm 5; a second arm 6; a first wrist element 7; a second wrist element (movable part) 8; a third wrist element 9; and a control device 2. The base 3 is fixed to a floor surface. The revolving body 4 is supported on the base 3 in a rotatable manner about the vertical first axis J1. The first arm 5 is supported on the revolving body 4 in a rotatable manner about the horizontal second axis J2. The second arm 6 is supported on the first arm 5 in a rotatable manner about the horizontal third axis J3. The first wrist element 7 is supported on the second arm 6 in a rotatable manner about the fourth axis J4 which is skewed in positional relation to the third axis J3. The second wrist element 8 is supported on the first wrist element 7 in a rotatable manner about the fifth axis J5 (a first axis of rotation, a second axis of rotation) orthogonal to the fourth axis J4. The third wrist element 9 is supported on the second wrist element 8 in a rotatable manner about the sixth axis J6 orthogonal to the fifth axis J5. The control device 2 controls rotational drive about the six axes J1 to J6.

A motor not shown in the drawing for performing rotational drive, and an encoder not shown in the drawing, which detects a rotation angle of the motor, are provided for each of the six axes J1 to J6. The control device 2 performs feedback control, which causes the motors to perform rotational drive, using rotation angles of the motors which are detected from the encoders provided for the respective axes J1 to J6. The control device 2 is formed of a CPU, a ROM, a RAM, and a memory, which are not shown in the drawing.

The first wrist element 7 includes a housing body (base member) 87 and housing covers 88, 89. The housing body 87 incorporates a J5 axis motor which causes the second wrist element 8 to rotate about the fifth axis J5, and other components. The housing covers 88, 89 are fixed to the housing body 87, thus sealing an inner space of the housing body 87.

Figure 2:
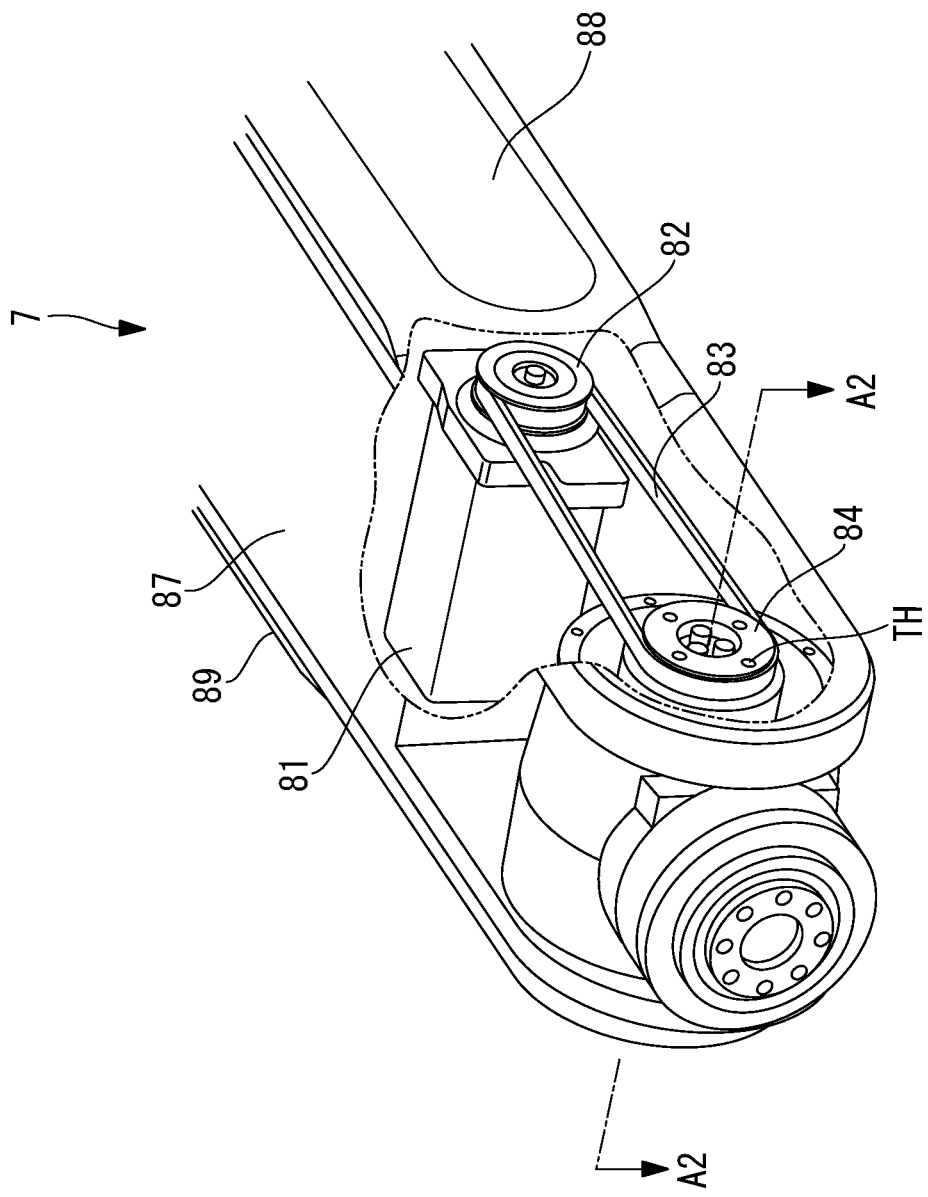
FIG. 2 is an explanatory view of a portion A1 in FIG. 1.

FIG. 2 shows a portion A1 in FIG. 1 for describing components incorporated in the first wrist element 7 of the robot 1. The housing body 87 has a hollow quadrangular prism shape which extends in the longitudinal direction of the first wrist element 7.

The housing body 87 accommodates the J5 axis motor 81 which causes the second wrist element 8 to rotate about the fifth axis J5. As shown in FIG. 2, a rotary shaft of the J5 axis motor 81 extends from the J5 axis motor 81 to the housing cover 88, and a first pulley 82 is fixed to a distal end of the rotary shaft. A rotary shaft not shown in the drawing on the fifth axis J5 is disposed on the distal end side of the first wrist element 7, and a second pulley (power transmission member) 84, which is coupled to the rotary shaft by way of a reducer, is disposed on the distal end side of the first wrist element 7. A belt 83 winds around and extends between the first pulley 82 and the second pulley 84 so as to transmit a rotational driving force of the J5 axis motor 81 to the rotary shaft on the fifth axis J5 via the belt 83.

As shown in FIG. 2, four through holes TH are formed in the second pulley 84, and the through holes TH penetrate the second pulley 84 in the direction parallel to the thickness direction of the second pulley 84. The four through holes TH are formed in the second pulley 84 at positions which are equidistantly separated from the axis center of the fifth axis J5 in the radial direction, and which differ in phase by 90 degrees in the circumferential direction.

Figure 3:
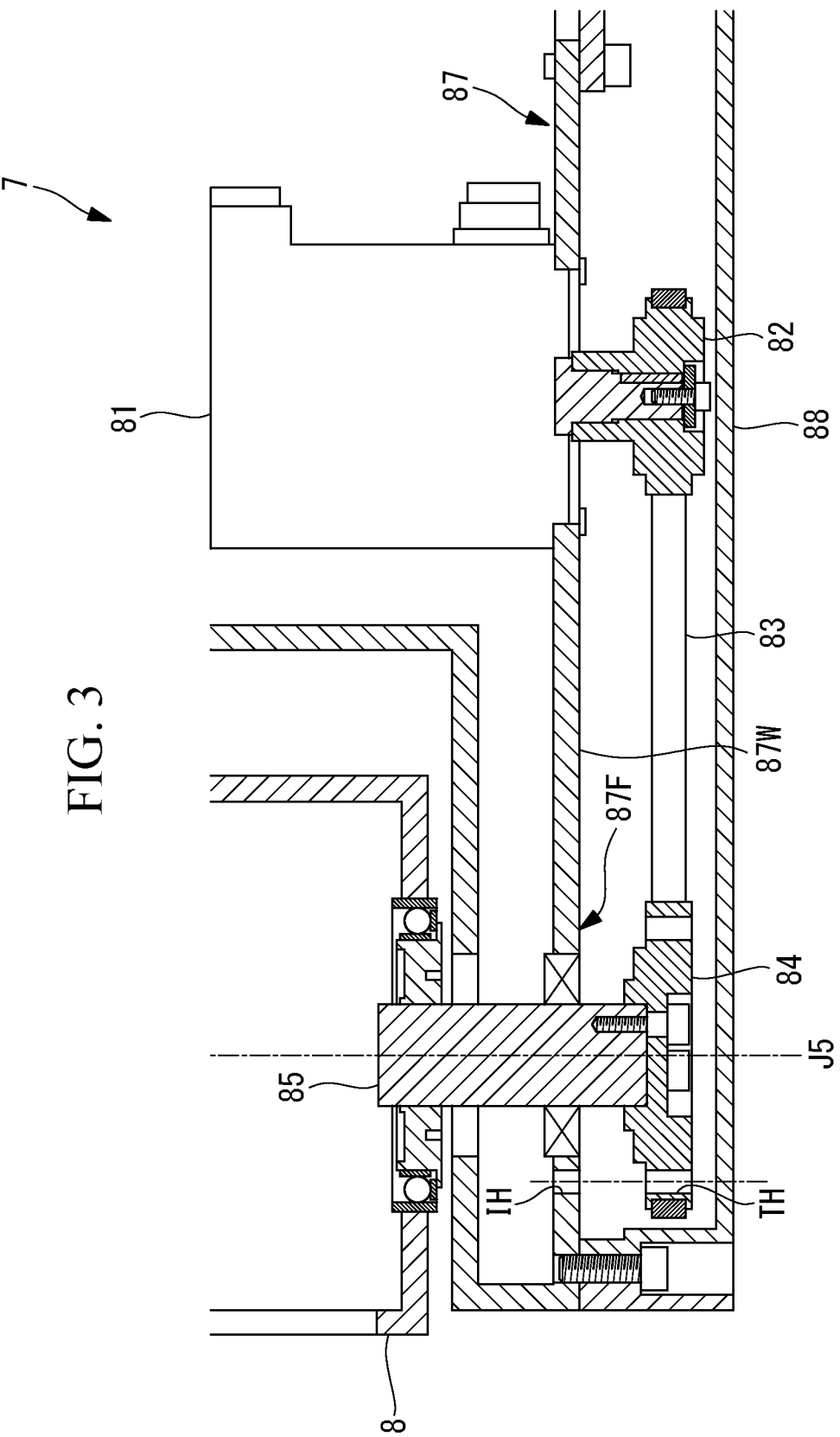
FIG. 3 is a cross-sectional view taken along cross section A2 in FIG. 2.

FIG. 3 is a cross-sectional view of the first wrist element 7 taken along cross section A2 in FIG. 2. As shown in FIG. 3, the second pulley 84 is fixed to a J5 rotary shaft 85 which causes the second wrist element 8 to rotate about the fifth axis J5 with respect to the first wrist element 7. The J5 rotary shaft 85 is coupled to the reducer not shown in the drawing at the other end thereof to which the second pulley 84 is not fixed. Accordingly, when the second pulley 84 rotates, the J5 rotary shaft 85 and the second wrist element 8 rotate about the fifth axis J5 with respect to the first wrist element 7.

As shown in FIG. 3, the housing body 87 includes a side plate 87W having a pulley opposing surface (front surface) 87F which opposes the second pulley 84. The side plate 87W has a flat plate shape orthogonal to the fifth axis J5. An insertion hole IH is formed in the side plate 87W in a penetrating manner in the direction parallel to the fifth axis J5. In other words, the insertion hole IH penetrates the side plate 87W in the axial direction which is parallel to the thickness direction of the second pulley 84. The inner diameter of the insertion hole IH is set equal to the inner diameter of the through hole TH formed in the second pulley 84. The insertion hole IH is formed such that a distance from the fifth axis J5 to the insertion hole IH is equal to a radius from the center of the second pulley 84 to the through hole TH. In other words, a distance from the fifth axis J5 to the axis of the insertion hole IH is equal to a distance from the fifth axis J5 to the axis of the through hole TH. Accordingly, as shown in FIG. 3, when a rotational phase of the second pulley 84 assumes a predetermined phase, the axis of the through hole TH and the axis of the insertion hole IH align with each other.

Figure 4:
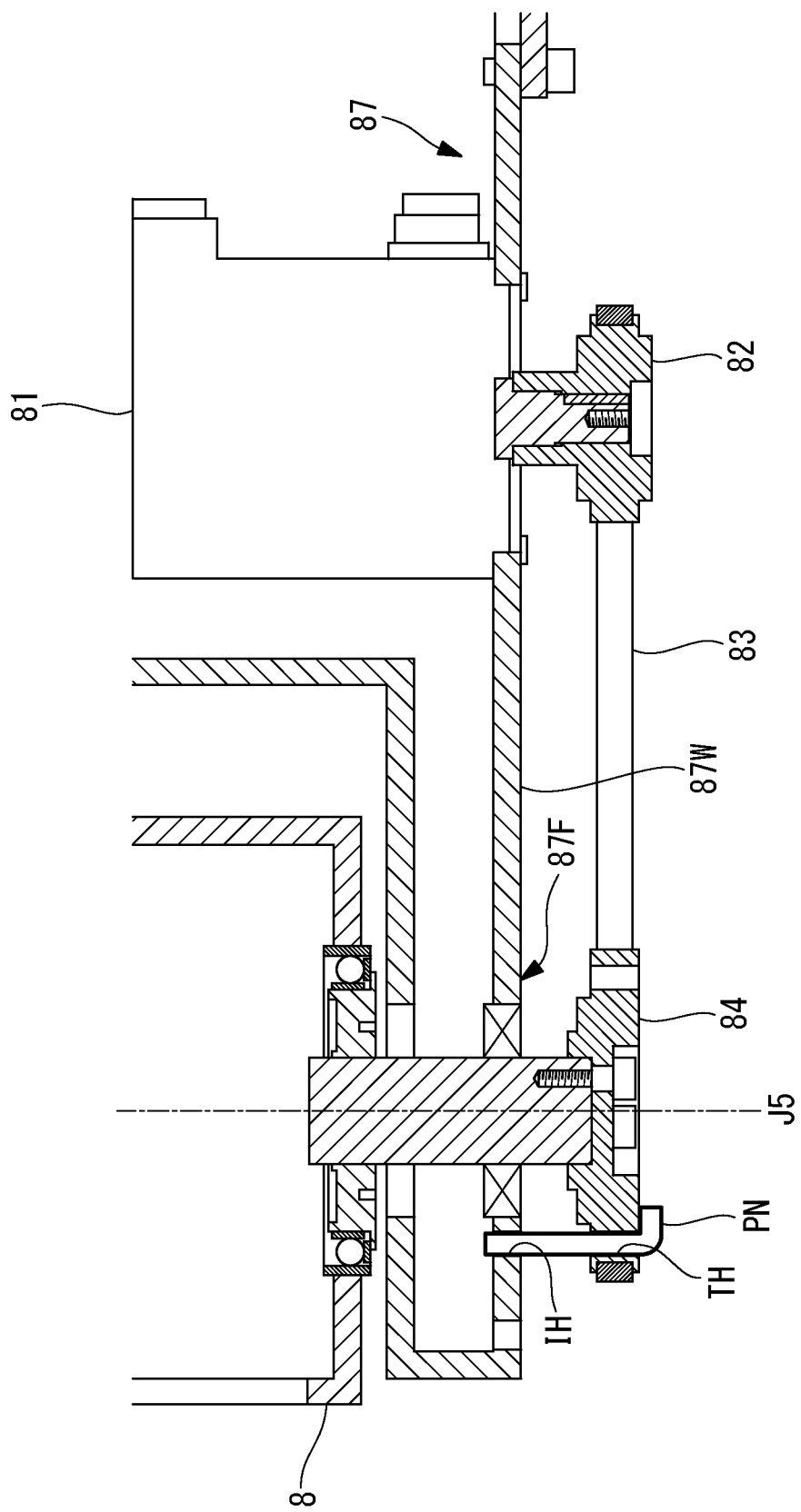
FIG. 4 is a cross-sectional view taken along cross section A2 in FIG. 2, and showing a state where a housing cover is removed, and a pin is inserted into a through hole and an insertion hole.

FIG. 4 shows a state where the housing cover 88 is removed from the housing body 87, and a pin (fixing pin) PN is inserted into the through hole TH and the insertion hole IH in a state where the axis of the through hole TH and the axis of the insertion hole IH align with each other. The pin PN has a rod-like shape having a circular shape in cross section, and extending in the longitudinal direction. The pin PN is made of metal. The pin PN is formed with an outer diameter which is slightly smaller than the inner diameters of the through hole TH and the insertion hole IH so as to allow the pin PN to be inserted into the through hole TH and the insertion hole IH. One end of the pin PN is bent by 90 degrees from the center axis of the pin PN, thus having a cross-sectional area larger than the cross-sectional area of other portions or the cross-sectional area of the through hole TH. Accordingly, even when the pin PN is inserted into the through hole TH and the insertion hole IH as shown in FIG. 4, the pin PN catches on a side surface of the second pulley 84 while being prevented from passing through the through hole TH and escaping toward the second wrist element 8.

In the robot 1 according to this embodiment having such a configuration, the radius from the fifth axis J5, which is the axis of rotation of the second pulley 84, to the axis center of the through hole TH formed in the second pulley 84 is set equal to a distance from the fifth axis J5 to the axis center of the insertion hole IH formed in the pulley opposing surface 87F of the housing body 87. Accordingly, when the second pulley 84 is rotated so as to cause the axis of the through hole TH to align with the axis of the insertion hole IH and, thereafter, the pin PN is inserted into the through hole TH and the insertion hole IH, the position of the through hole TH is fixed with respect to the insertion hole IH. That is, rotation of the second pulley 84 is fixed with respect to the housing body 87 and, as a result, an attitude of the second wrist element 8 is fixed with respect to the first wrist element 7.

When the attitude of the second wrist element 8 is fixed with respect to the first wrist element 7, even in a state where a brake of the J5 axis motor 81, which supplies a rotational driving force to the fifth axis J5, is released, there is no possibility of the second wrist element 8 moving with respect to the first wrist element 7 due to the weight of the second wrist element 8 or the like. Accordingly, in performing a maintenance operation or the like on the robot 1, it is neither necessary to remove a heavy object, such as the hand, which is mounted at the distal end of the robot 1, nor to control the second wrist element 8 to assume a stationary state in an attitude which is not affected by gravity. Further, it is also not necessary to use a large-scaled jig for fixing the attitude of the second wrist element 8 with respect to the first wrist element 7.

In this embodiment, only the pin PN is required as a component separate from the robot 1 to fix the second wrist element 8 with respect to the first wrist element 7. Tolerances of diameters of the through hole TH and the insertion hole IH into which the pin PN is to be inserted may be set to an extent which allows the pin PN to be inserted into the through hole TH and the insertion hole IH. In many cases, holes are formed in the second pulley 84 in a penetrating manner in the thickness direction so as to enhance ease of assembly and to reduce rotational energy. Accordingly, these holes can be utilized as the through hole TH into which the pin PN is to be inserted. As a result, in the robot 1 of this embodiment, a maintenance operation or the like is easily performed at low cost, and the time for the maintenance operation and the time during which production equipment including the robot 1 is stopped can be shortened.

Figure 5:
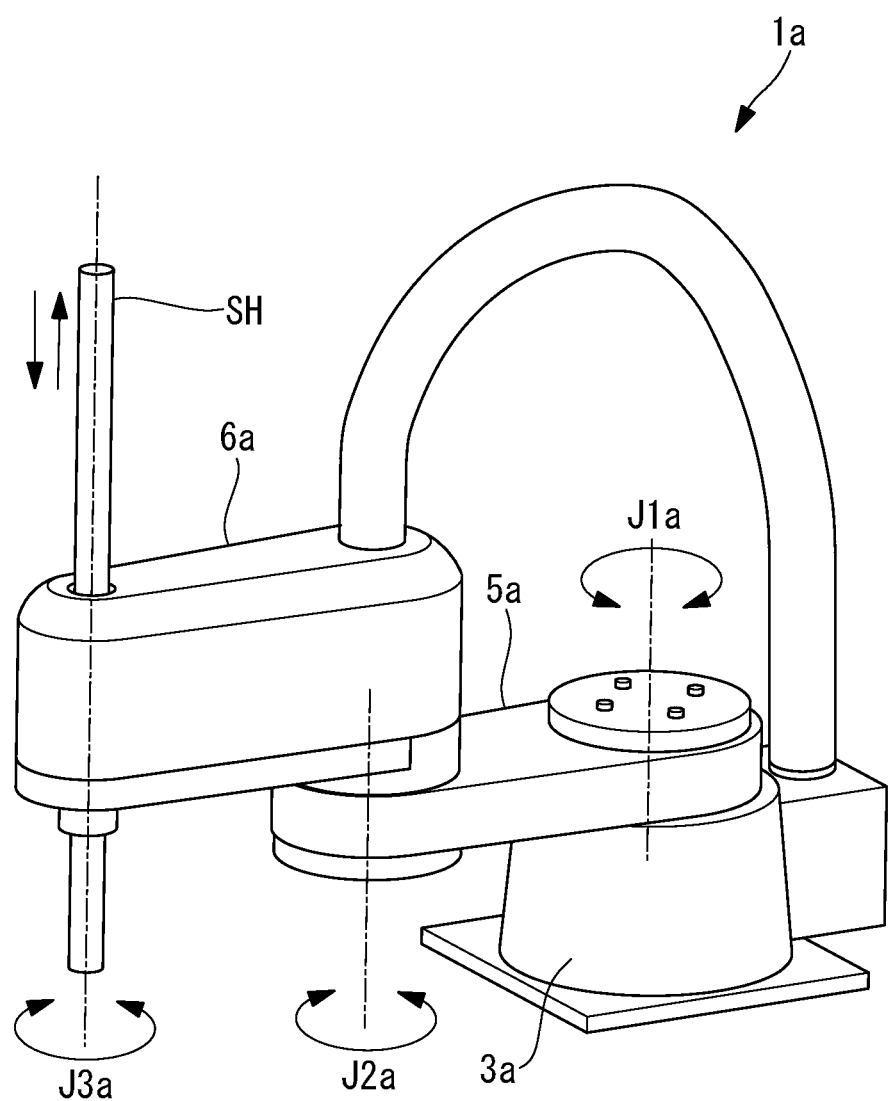
FIG. 5 is a schematic perspective view of a robot according to a second embodiment.

FIG. 5 is a schematic perspective view of a robot 1a according to a second embodiment. The robot 1a is a horizontal articulated robot which includes four joint shafts which are driven by rotational driving forces of four motors not shown in the drawing. As shown in FIG. 5, the robot 1a includes: a base 3a; a first arm 5a; a second arm 6a; and a shaft SH. The base 3a is fixed to an installation surface. The first arm 5a is supported on the base 3a in a rotatable manner about a vertical first axis J1a. The second arm 6a is supported on the first arm 5a in a rotatable manner about a vertical second axis J2a. The shaft SH is supported in a rotatable manner about a vertical third axis (a first axis of rotation, a second axis of rotation) J3a, and in a linearly movable manner along the axial direction of the third axis J3a.

Figure 6:
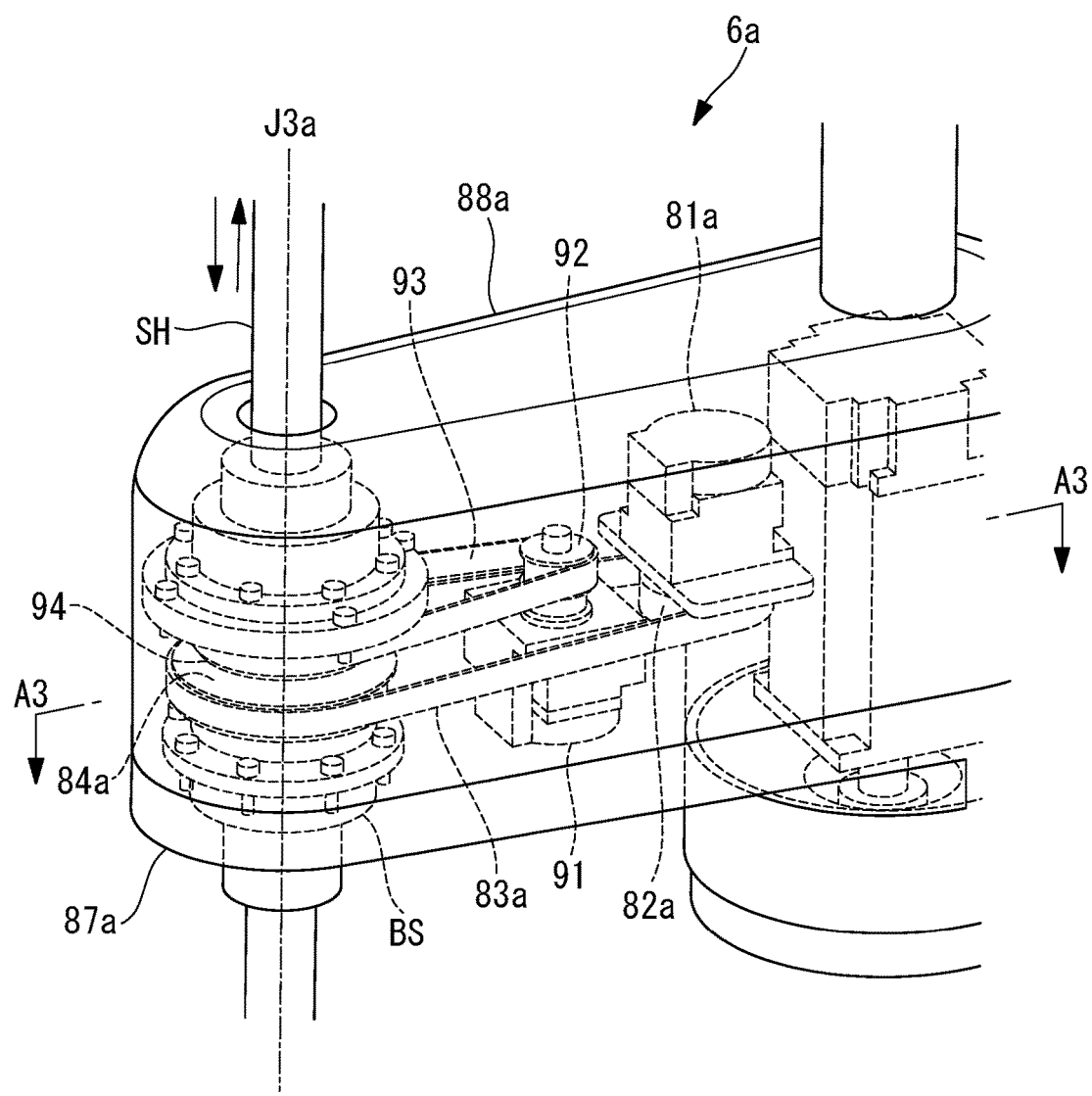
FIG. 6 is an explanatory view of a second arm of the robot of the second embodiment.

FIG. 6 shows respective components incorporated in the second arm 6a. As shown in FIG. 6, the second arm 6a includes a housing body 87a, and a housing cover 88a which covers the housing body 87a from above. The second arm 6a incorporates: a linear motor 81a; a first pulley 82a; a ball screw BS; a second pulley (power transmission member) 84a; and a belt 83a. The linear motor 81a causes the shaft to linearly move in the direction of the third axis J3a. The first pulley 82a is fixed to a rotary shaft of the linear motor 81a. The ball screw BS is fixed to the shaft SH. The second pulley 84a is fixed to the ball screw BS. The belt 83a winds around and extends between the first pulley 82a and the second pulley 84a. When the rotary shaft of the linear motor 81a rotates, a rotational driving force of the first pulley 82a is transmitted to the second pulley 84a via the belt 83a. When the second pulley 84a rotates, a rotational driving force of the second pulley 84a is transmitted to the ball screw BS so that the shaft SH moves along the direction of the third axis J3a.

The second arm 6a incorporates: a J3a axis motor 91; a third pulley 92; a fourth pulley 94; and a belt 93. The third pulley 92 is fixed to a rotary shaft of the J3a axis motor 91. The fourth pulley 94 is fixed to the shaft SH. The belt 93 winds around and extends between the third pulley 92 and the fourth pulley 94. When the rotary shaft of the J3a axis motor 91 rotates, a rotational driving force of the third pulley 92 is transmitted to the fourth pulley 94 via the belt 93. When the fourth pulley 94 rotates, the shaft SH rotates about the third axis J3a.

Figure 7:
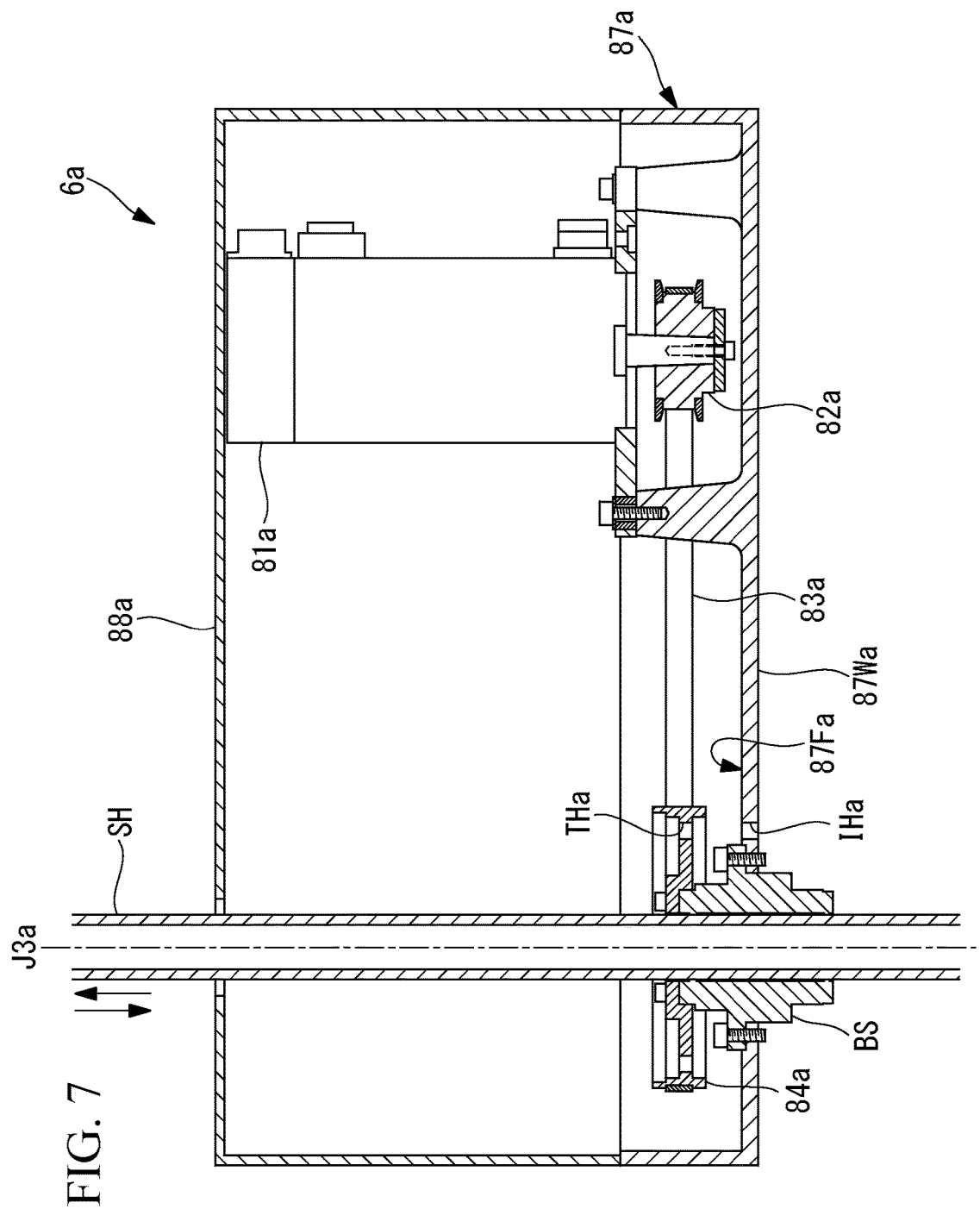
FIG. 7 is a cross-sectional view taken along cross section A3 in FIG. 6.

FIG. 7 is a cross-sectional view showing cross section A3 shown in FIG. 6 and taken along an axis of the shaft SH. In FIG. 7, to facilitate the understanding of a through hole THa and an insertion hole IHa described later, the illustration of the J3a axis motor 91, the third pulley 92, the fourth pulley 94, and the belt 93 which cause the shaft SH to rotate about the third axis J3a is omitted. As shown in FIG. 7, in the same manner as the second pulley 84 in the first embodiment, four through holes THa are formed in the second pulley 84a in a penetrating manner in the thickness direction. The through holes THa are formed in the second pulley 84a such that axes of the through holes THa extend parallel to the third axis J3a which is the center axis of the shaft SH.

As shown in FIG. 7, the housing body 87a includes a bottom plate 87Wa having a pulley opposing surface (front surface) 87Fa which opposes the second pulley 84a. The bottom plate 87Wa has a flat plate shape orthogonal to the third axis J3a of the shaft SH. An insertion hole IHa is formed in the bottom plate 87Wa in a penetrating manner in the direction parallel to the third axis J3a, that is, in the direction parallel to the thickness direction of the second pulley 84a. The inner diameter of the insertion hole IHa is set equal to the inner diameter of the through hole THa formed in the second pulley 84a. The insertion hole IHa is formed such that a distance from a center axis of the third axis J3a to the insertion hole IHa is equal to a radius from the center of the second pulley 84a to the center of the through hole THa. In other words, a distance from the third axis J3a to the axis of the insertion hole IHa is equal to a distance from the third axis J3a to the axis of the through hole THa. Accordingly, in the same manner as the first embodiment, when a rotational phase of the second pulley 84a assumes a predetermined phase, the axis of the through hole THa and the axis of the insertion hole IHa align with each other.

Figure 8:
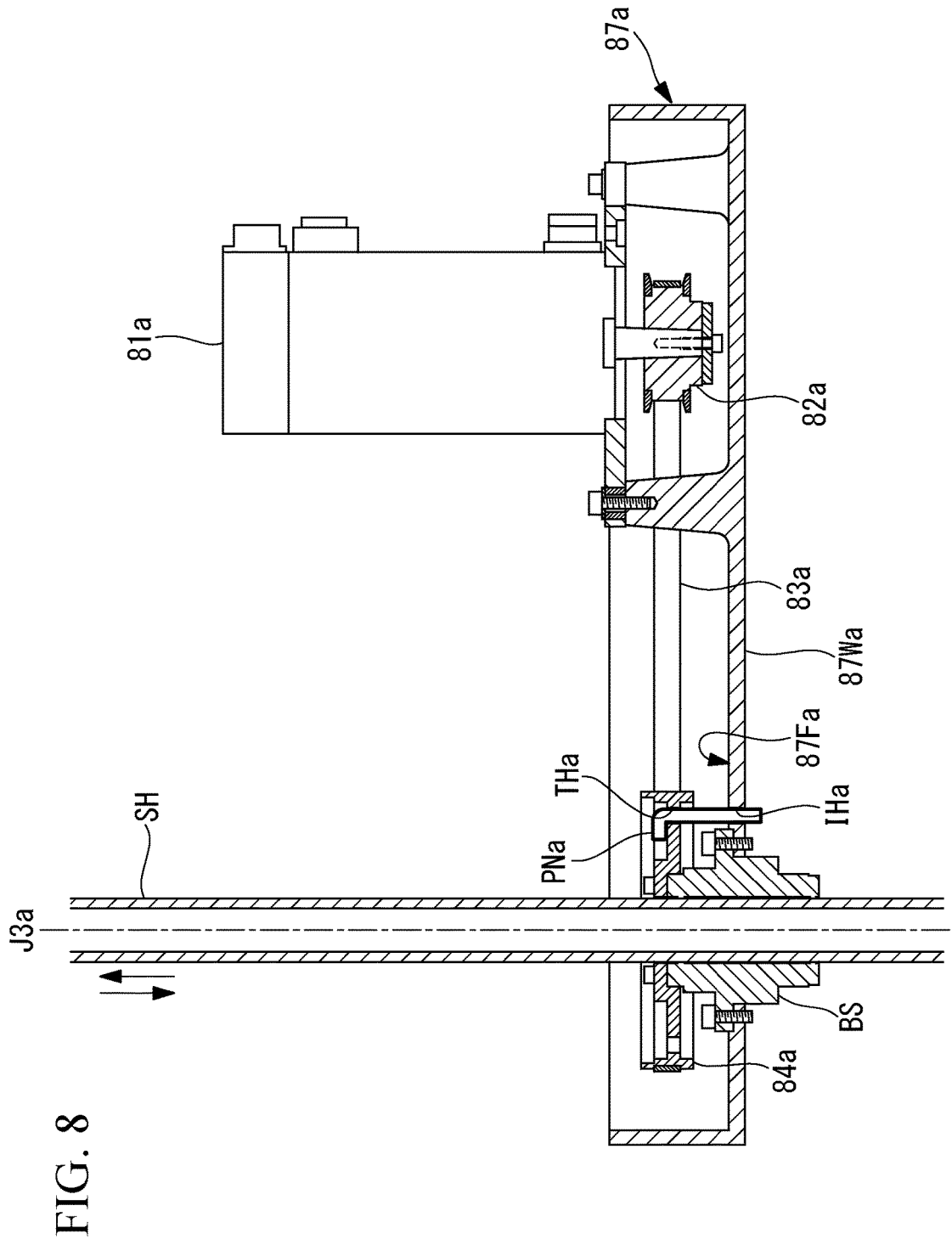
FIG. 8 is a cross-sectional view taken along cross section A3 in FIG. 6, and showing a state where a housing cover is removed, and a pin is inserted into a through hole and an insertion hole.

FIG. 8 shows a state where the housing cover 88a is removed from the housing body 87a, and a pin (fixing pin) PNa is inserted into the through hole THa and the insertion hole IHa in a state where the axis of the through hole THa and the axis of the insertion hole IHa align with each other. The pin PNa in the second embodiment is the same as the pin PN in the first embodiment.

As described above, in the robot 1a according to the second embodiment, in inserting the pin PNa into the through hole THa and the insertion hole IHa in a state where the axes of the through hole THa and the insertion hole IHa align with each other and hence, rotation of the second pulley 84a is fixed with respect to the housing body 87a. Fixing rotation of the second pulley 84a prevents the ball screw BS from rotating and hence, the shaft SH can be fixed so as not to move along the third axis J3a with respect to the second arm 6a.

In the above-mentioned first embodiment and second embodiment, the description has been made with respect to the robot 1, 1a which includes the second pulley 84, 84a, in which the through holes TH, THa are formed, and the housing body 87, 87a, in which the insertion hole IH, IHa is formed. However, a system for fixing the robot 1, 1a may be configured such that the pin PN, PNa inserted into the through hole TH, THa and the insertion hole IH, IHa is added to the robot 1, 1a.

Shapes or the number of through holes TH, THa and insertion holes IH, IHa may be variously modified. For example, it is not always necessary for the insertion hole IH, IHa to penetrate the side plate 87W of the housing body 87 or the bottom plate 87Wa of the housing body 87a. A configuration may be adopted where a threaded hole is formed on the insertion hole IH, IHa, and the threaded hole is fastened to male threads formed on a distal end of the pin PN, PNa. The through hole TH, THa and the insertion hole IH, IHa may have shapes which differ from each other. The cross-sectional shapes of the through hole TH, THa and the insertion hole IH, IHa are not limited to a circular shape, and may be a rectangular shape or another shape. For example, it may be configured such that the through holes TH, THa are formed into a fan shape which corresponds to a phase of 60 degrees, thus facilitating the positioning of the through hole TH, THa with the insertion hole IH, IHa formed into a circular shape. In this case, the insertion hole IH, IHa and the pin PN, PNa may have the same fan shape as the through holes TH, THa in cross section so as to allow the pin PN, PNa, inserted into the through hole TH, THa and the insertion hole IH, IHa, to increase a restricting force against rotation of the pulley. Further, it may be configured such that a plurality of through holes TH, THa and a plurality of insertion holes IH, IHa are formed, and the pins PN, PNa are inserted into some of the through holes TH, THa and the insertion holes IH, IHa.

Shapes or the number of pins PN may also be variously modified. In the above-mentioned first embodiment and second embodiment, the end portion of the pin PN, which is positioned on the second pulley 84, 84a side in a state of being inserted into the holes, is bent. However, the end portion of the pin PN may not be bent, or may have another shape.

In the above-mentioned first embodiment and second embodiment, the second pulley 84, 84a, fixed to the rotary shaft which performs rotation or linear motion as a joint shaft, is fixed with respect to the housing body 87, 87a. However, the first pulley 82, 82a fixed to the J5 axis motor 81 or the linear motor 81a may be fixed with respect to the housing body 87, 87a. To be more specific, it may be configured such that the through holes TH, THa are formed in the first pulley 82, 82a, and the insertion hole IH, IHa which uses the same axis as the through hole TH, THa as the center thereof may be formed in the housing body 87, 87a. Further, the joint shaft where rotation is restricted via the pulley, in which the through holes TH, THa are formed, may be any of the joint shafts of the robot 1, 1a. Alternatively, a plurality of joint shafts may be simultaneously fixed by the plurality of pins PN, PNa. In the first embodiment and the second embodiment, the second pulley 84, 84a has been described as an example of the power transmission member which rotates about an axis center, and in which through holes are formed. However, the power transmission member may be formed of a spur gear. In this case, the spur gear in which the through holes are formed may be directly meshed with a gear which substitutes for the first pulley 82, 82a without via the belt, or may be meshed with the gear which substitutes for the first pulley 82, 82a via another gear.

From the above-described embodiment, the following invention is derived.

According to one aspect of the present invention, there is provided a robot fixing system which includes: a base member having a front surface in which an insertion hole is formed; a power transmission member configured to supply a rotational driving force to a movable part, which is supported on the base member in a rotatable manner about a first axis of rotation, by rotating about a second axis of rotation while opposing the front surface, a through hole being formed in the power transmission member to extend parallel to the second axis of rotation in a penetrating manner at a position separated from the second axis of rotation by a distance equal to a distance from the second axis of rotation to the insertion hole; and a fixing pin configured to be simultaneously inserted into the through hole and the insertion hole.

According to this aspect, adjusting a rotation angle of the power transmission member causes the through hole and the insertion hole to be coaxially arranged, thus allowing the fixing pin to be inserted into the through hole and the insertion hole. When the fixing pin is inserted into the through hole and the insertion hole in such a state, rotation of the power transmission member is fixed by the fixing pin with respect to the base member. When the power transmission member is fixed to the base member, rotation of the movable part, which is rotatable about the first axis of rotation with the supply of a rotational driving force by the power transmission member, with respect to the base member is restricted.

With such a configuration, even in a state where a brake of the motor, which supplies a rotational driving force to the power transmission member and the movable part, is released, there is no possibility of the movable part moving with respect to the base member due to the dead weight of the movable part or the weight of the hand and the like fixed to the movable part. Accordingly, in performing a maintenance operation on the robot or the like, it is neither necessary to remove a heavy object, such as a hand, nor to control the movable part to assume a stationary state in an attitude which is not affected by gravity. Further, it is also not necessary to use a large-scaled jig for fixing the attitude of the movable part with respect to the base member.

Further, only the fixing pin is required as a component separate from the robot to fix the movable part with respect to the base member. Tolerances of diameters of the through hole and the insertion hole into which the fixing pin is to be inserted may have a degree of accuracy which allows the fixing pin to be inserted into the through hole and the insertion hole. In many cases, holes are formed in the power transmission member in a penetrating manner in the thickness direction so as to enhance ease of assembly and to reduce rotational energy. Accordingly, these holes can be utilized as the through hole into which the fixing pin is to be inserted. As a result, a maintenance operation or the like is easily performed at low cost, and the time for the maintenance operation and the time during which production equipment including the robot is stopped can be shortened.

In the above-mentioned aspect, the insertion hole may be formed of a threaded hole, and one end of the fixing pin may be fastened to the threaded hole.

With such a configuration, the fixing pin inserted into the through hole and the insertion hole is fixed to the insertion hole by fastening. Accordingly, the movable part can be more firmly fixed to the base member.

In the above-mentioned aspect, a cross-sectional area of the one end of the fixing pin may be set larger than a cross-sectional area of the through hole.

With such a configuration, one end of the fixing pin, which is inserted into the through hole and the insertion hole, catches on an end portion of the through hole. Accordingly, it is possible to fix the power transmission member to the base member without allowing the whole fixing pin to pass through the through hole.

According to another aspect of the present invention, there is provided a robot which includes: a base member having a front surface in which an insertion hole is formed; and a power transmission member configured to supply a rotational driving force to a movable part, which is supported on the base member in a rotatable manner about a first axis of rotation, by rotating about a second axis of rotation while opposing the front surface, a through hole being formed in the power transmission member to extend parallel to the second axis of rotation in a penetrating manner at a position separated from the second axis of rotation by a distance equal to a distance from the second axis of rotation to the insertion hole.

According to this aspect, in a state where the axis of the through hole, formed in the power transmission member, and the axis of the insertion hole, formed in the front surface of the base member, align with each other, a rod-like member, such as a fixing pin which is a separate component, is inserted into the through hole and the insertion hole so that the position of the power transmission member is fixed with respect to the base member.

With such a configuration, even in a state where a brake of the motor, which supplies a rotational driving force to the power transmission member and the movable part, is released, an attitude of the movable part is fixed with respect to the base member. Accordingly, a maintenance operation or the like is easily performed at low cost, and the time for the maintenance operation and the time during which production equipment including the robot is stopped can be shortened.

The invention claimed is:

1. A robot fixing system comprising:
   a base member having a front surface in which an insertion hole is formed;
   a power transmission member configured to supply a rotational driving force to a movable part, which is supported on the base member in a rotatable manner about a first axis of rotation, by rotating about a second axis of rotation while opposing the front surface, a through hole being formed in the power transmission member to extend parallel to the second axis of rotation in a penetrating manner at a position separated from the second axis of rotation by a distance equal to a distance from the second axis of rotation to the insertion hole; and
   a fixing pin configured to be simultaneously inserted into the through hole and the insertion hole.

2. The robot fixing system according to claim 1, wherein the insertion hole is formed of a threaded hole, and
one end of the fixing pin is fastened to the threaded hole.

3. The robot fixing system according to claim 1, wherein a cross-sectional area of the one end of the fixing pin is set larger than a cross-sectional area of the through hole.

4. A robot comprising:
a base member having a front surface in which an insertion hole is formed; and
a power transmission member configured to supply a rotational driving force to a movable part, which is supported on the base member in a rotatable manner about a first axis of rotation, by rotating about a second axis of rotation while opposing the front surface, a through hole being formed in the power transmission member to extend parallel to the second axis of rotation in a penetrating manner at a position separated from the second axis of rotation by a distance equal to a distance from the second axis of rotation to the insertion hole.

* * * * *